Feb. 1, 1949.   R. E. PRENTICE   2,460,363
CARRYING CORD CONNECTING MEANS
Filed Jan. 26, 1946
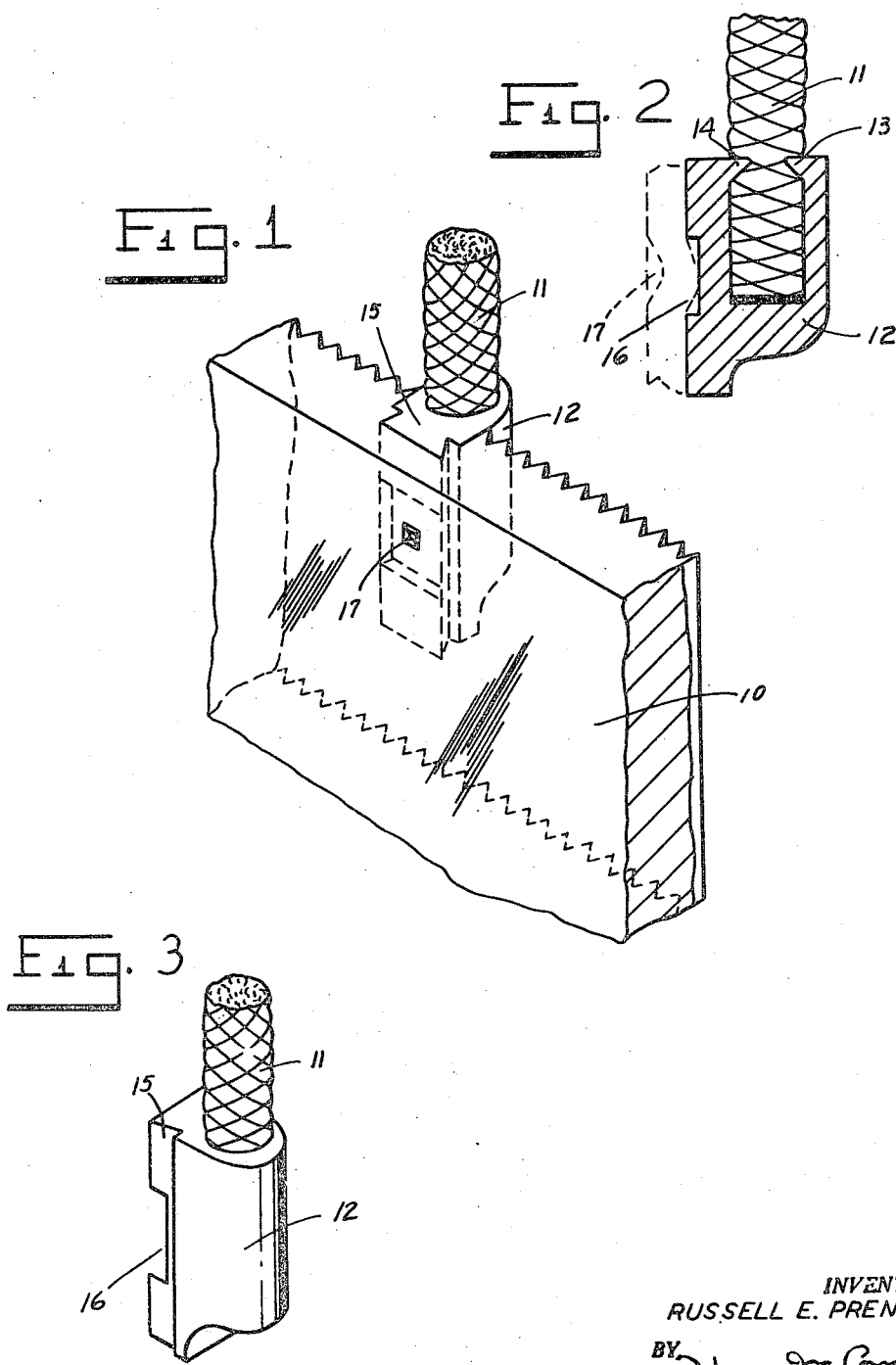
INVENTOR.
RUSSELL E. PRENTICE
ATTORNEYS Patented Feb. 1, 1949

2,460,363

UNITED STATES PATENT OFFICE 2,460,363

CARRYING CORD CONNECTING MEANS

Russell E. Prentice, Dexter, Mich., assignor to General Aniline & Film Corporation, New York, N. Y., a corporation of Delaware Application January 26, 1946, Serial No. 643,809

3 Claims. (Cl. 224—5)

This invention pertains to an attachment for a camera carrying strap or neck cord.

It is an object of the invention to devise a simple means for attaching the carrying strap or neck cord to cameras having plastic cases or bodies.

It is a further object of the invention to devise a secure connection for such cords or straps without resort to special machine operations or complicated connecting parts.

The invention will be described by reference to one specific embodiment thereof illustrated in the accompanying figures of drawing, in which:

Fig. 1 is an isometric view of a section of one side of a camera casing showing the connecting lug and the method by which it is secured to the casing.

Fig. 2 is a section through one form of lug in which an end of a cord has been fixed.

Fig. 3 is an isometric view showing the attaching lug as seen from the opposite side from that viewed in Fig. 1.

Now referring to the figures of drawing, a section of the camera casing (greatly enlarged) is designated by numeral 10 while the carrying cord 11, a part only of which is shown, is held within a lug 12 of special construction and which is set into the wall 10 and locked by a method hereinafter to be described.

The cord 11 which may be a neck cord or a carrying cord or strap is herein indicated as a braided cord but may be of leather, fabric, spun glass, or other materials suitable for the purpose, and may be fabricated in any desired manner.

The lug 12 is preferably formed by die casting but may be of molded plastic. If it is of die-cast metal, the cord 11 may be inserted in the die so that the metal is cast about the cord. In that event, the cord should have an external surface in which there are indentations, such as would be present, for example, in a braided cord and into which the metal may flow during the casting operation. That will lock the ends of the cord in the lugs and no additional securing means will be found necessary.

In the event the metallic lugs 12 are molded independently, the cord ends may be inserted in the cored hole after which the edges or top face of the lugs may be upset or crimped by a squeezing process or by a blow with some suitable instrument. In Fig. 2, such a lug is illustrated having the crimped projections 13 and 14 which indent or project into the cord sufficiently far to lock it in position.

If a plastic lug is employed, then that plastic may be cast about the end of a cord, or may be cast independently and the cord inserted. In the latter instance, the material should be of thermoplastic type so that heat may be employed to crimp or otherwise upset certain portions of the lug adjacent the cord thereby to secure it in position.

In production, cords are cut to length and lugs attached at either end thereof whereupon the assembly cords are then permanently connected to their respective camera casings. As shown in Figs. 1 and 3, the part of a lug which is attached to the molded plastic camera wall is provided with a dove-tailed projection 15 and a transverse slot or groove 16.

The camera casing wall has also been molded to provide a complementary slot into which the dove-tail projection 15 may fit, also into which a part of the lug beyond the dove-tail may be inserted. Of course, the amount of material of the lug which is actually encased within the wall of the casing may be varied as desired and as governed by different shapes of lug and thicknesses of camera casing wall. The actual extent of the dove-tail projection 15 in a lengthwise direction may also be varied although it is preferable that it extend the full length of the lug.

The parts are molded so that there is a reasonable clearance permitting insertion of the lug in the receiving slot molded in the wall 10, but the accuracy maintainable is such that no excessive amount of clearance may be provided.

To lock the parts finally so that the cord may serve its intended purpose, heat is applied at the inner side of the wall 10 as at the point 17, and the wall is thus deformed and pushed inwardly or caused to flow, to engage within the groove 16 thereby to prevent withdrawal of the lug. A heated iron having a suitably shaped point is employed for this purpose and it may be seen that assembly and permanent connection of the lugs and thus the neck cords and carrying straps require very little manual labor, yet the assembled elements perform their function very well and are amply strong to prevent failure over a long period of service.

In the preferred form of the invention, the camera casing has been described as being made of plastic material and preferably of some such material as may be deformed by heat. The invention is not to be so limited but may be applied to any material wherein a suitable indentation for reception of the lug may be easily provided during manufacture of the casing, and in which the material of the wall may be upset, indented, caused to flow, or otherwise easily deformed to lock the lug in place.

In the specification and claims, the terms "case" or "camera case" are to be understood to include any camera body or closure. The term "cord" includes all straps, cords or carrying elements such as are employed for the purpose.

While one embodiment of the invention has been disclosed, it is to be understood that the inventive concept may be carried out in a number of ways. This application is, therefore, not to be limited to the precise details described, but is intended to cover all variations and modifications thereof falling within the spirit of the invention and the scope of the claims.

I claim:

1. In combination, a camera case and carrying cord and connecting means for said cord and case which includes a lug having an opening in which a cord end is held, an indentation in the camera case into which the said lug may be inserted, said indentation and lug having complementary engaging surfaces by which the lug is held against displacement in one direction, and means to prevent displacement of the lug in the direction in which it is inserted which includes a depression at the inner face of the lug and material from the case caused to enter said depression after the lug has been inserted.

2. In combination, a camera case and carrying cord and connecting means for said cord and case which includes a lug having an opening in which a cord end is held, an indentation in the camera case in which the said lug may be inserted, said indentation and lug having a complementary dove-tail and slot by which the lug is held against displacement in one direction, and means to prevent displacement of the lug in the direction in which it is inserted which includes a groove transversely directed with respect to the direction of insertion and material from the case caused to enter said groove after the lug has been inserted.

3. In combination, a camera case and carrying cord and connecting means for said cord and case which includes a lug having an opening in which a cord end is held, an indentation in the camera case formed as a slot for a dove-tailed projection and into which said lug may be inserted, a dove-tailed projection on said lug engageable within said slot when the lug is assembled in the said indentation, and means to prevent displacement of the lug after insertion, said means including a depression in one face of the said lug and material from the said case caused to enter the depression after insertion of the lug.

RUSSELL E. PRENTICE.

REFERENCES CITED

The following references are of record in the file of this patent:

UNITED STATES PATENTS

| Number | Name | Date |
|---|---|---|
| 1,576,874 | Stevens | Mar. 16, 1926 |
| 1,744,199 | Baker | Jan. 21, 1930 |
| 2,041,518 | Salz | May 19, 1936 |
| 2,052,616 | Gardes | Sept. 1, 1936 |
| 2,241,229 | Williams | May 6, 1941 |
| 2,425,104 | Luce | Aug. 5, 1947 |
| 2,428,676 | Moore | Oct. 7, 1947 |